United States Patent
Nandury

(10) Patent No.: US 10,929,799 B2
(45) Date of Patent: Feb. 23, 2021

(54) IDENTIFICATION OF INACCURATE ADDRESSES FOR PACKAGE DELIVERIES

(71) Applicant: Amazon Technologies, Inc., Seattle, WA (US)

(72) Inventor: Venkata Kishore Nandury, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 780 days.

(21) Appl. No.: 15/637,231

(22) Filed: Jun. 29, 2017

(65) Prior Publication Data
US 2019/0005439 A1    Jan. 3, 2019

(51) Int. Cl.
*G06Q 10/08*    (2012.01)
*G06Q 50/32*    (2012.01)
*G06Q 30/06*    (2012.01)
*H04L 29/14*    (2006.01)
(Continued)

(52) U.S. Cl.
CPC .......... *G06Q 10/08* (2013.01); *G06F 15/177* (2013.01); *G06N 3/0445* (2013.01); *G06Q 10/083* (2013.01); *G06Q 30/06* (2013.01); *G06Q 30/0635* (2013.01); *G06Q 50/28* (2013.01); *G06Q 50/32* (2013.01); *H04L 29/08* (2013.01); *H04L 29/14* (2013.01); *H04L 67/2842* (2013.01); *H04L 69/40* (2013.01); *G06F 15/00* (2013.01); *G06Q 20/00* (2013.01); *H04L 29/00* (2013.01)

(58) Field of Classification Search
CPC ............. G06Q 10/083; G06Q 10/0833; G06Q 10/0835; G06Q 10/0837; G06Q 10/08; G06K 9/00

USPC ........................................................ 705/337
See application file for complete search history.

(56) References Cited

U.S. PATENT DOCUMENTS

2002/0152174 A1 * 10/2002 Woods .................. G06Q 10/08
                                                                  705/60
2009/0307206 A1    12/2009 Morrison et al.
(Continued)

FOREIGN PATENT DOCUMENTS

WO        2019005594 A1    1/2019

OTHER PUBLICATIONS

Ajao et. al., "Handwritten Address Destination Recognition Using Neural Networks", Journal of Science, Technology, Mathematics and Education (JOSTMED), 9(1), Dec. 2012 (Year: 2012).*
(Continued)

*Primary Examiner* — Kevin H Flynn
*Assistant Examiner* — Emmett K. Walsh
(74) *Attorney, Agent, or Firm* — Eversheds Sutherland US (LLP)

(57) ABSTRACT

Systems, methods, and computer-readable media are disclosed for identification of inaccurate addresses for package deliveries. In one embodiment, an example method may include determining a shipping address for a package that includes a product. A recurrent neural network may generate an address deliverability score by providing the shipping address as input. A set of corrective actions corresponding to the address deliverability score may be determined. The address deliverability score and the set of corrective actions may be presented. A selection of a corrective action from the set of corrective actions to implement prior to delivery of the package may be received.

20 Claims, 8 Drawing Sheets

(51) Int. Cl.
   *G06N 3/04*      (2006.01)
   *G06Q 50/28*     (2012.01)
   *G06F 15/177*    (2006.01)
   *H04L 29/08*     (2006.01)
   G06F 15/00       (2006.01)
   G06Q 20/00       (2012.01)
   H04L 29/00       (2006.01)

(56) References Cited

U.S. PATENT DOCUMENTS

| | | | |
|---|---|---|---|
| 2011/0153458 A1* | 6/2011 | Wong | G06Q 10/087 705/26.82 |
| 2011/0229018 A1* | 9/2011 | Maeda | G06K 9/033 382/159 |
| 2013/0157727 A1* | 6/2013 | Sudo | G06F 3/04883 455/566 |
| 2014/0351160 A1* | 11/2014 | Felse | G06Q 10/083 705/330 |
| 2016/0140596 A1 | 5/2016 | Green et al. | |
| 2016/0210532 A1* | 7/2016 | Soldevila | G06K 9/6215 |
| 2016/0224938 A1* | 8/2016 | Shah | G06Q 10/0838 |
| 2017/0220975 A1* | 8/2017 | Oba | G06F 16/316 |
| 2018/0089152 A1* | 3/2018 | Maksak | G06F 40/117 |
| 2018/0129933 A1 | 5/2018 | Wang et al. | |

OTHER PUBLICATIONS

International Search Report and Written Opinion for International Application No. PCT/US18/038917 dated Oct. 10, 2018 (22 pgs.).

\* cited by examiner

IDENTIFICATION OF INACCURATE ADDRESSES FOR PACKAGE DELIVERIES

BACKGROUND

Package delivery services may be provided by postal systems, express mail, private courier companies, and the like. Online retailers provide websites for retail sales direct to consumers. Consumers may provide shipping information, such as the name of a recipient, address, and contact information for parcels or packages to be delivered. There are many factors that may influence successful delivery to an address. For example, address accuracy, presence or absence of name plate/sign posts to identify a unit or sub-locality, physical approachability of the address, and the like.

Figure 1:
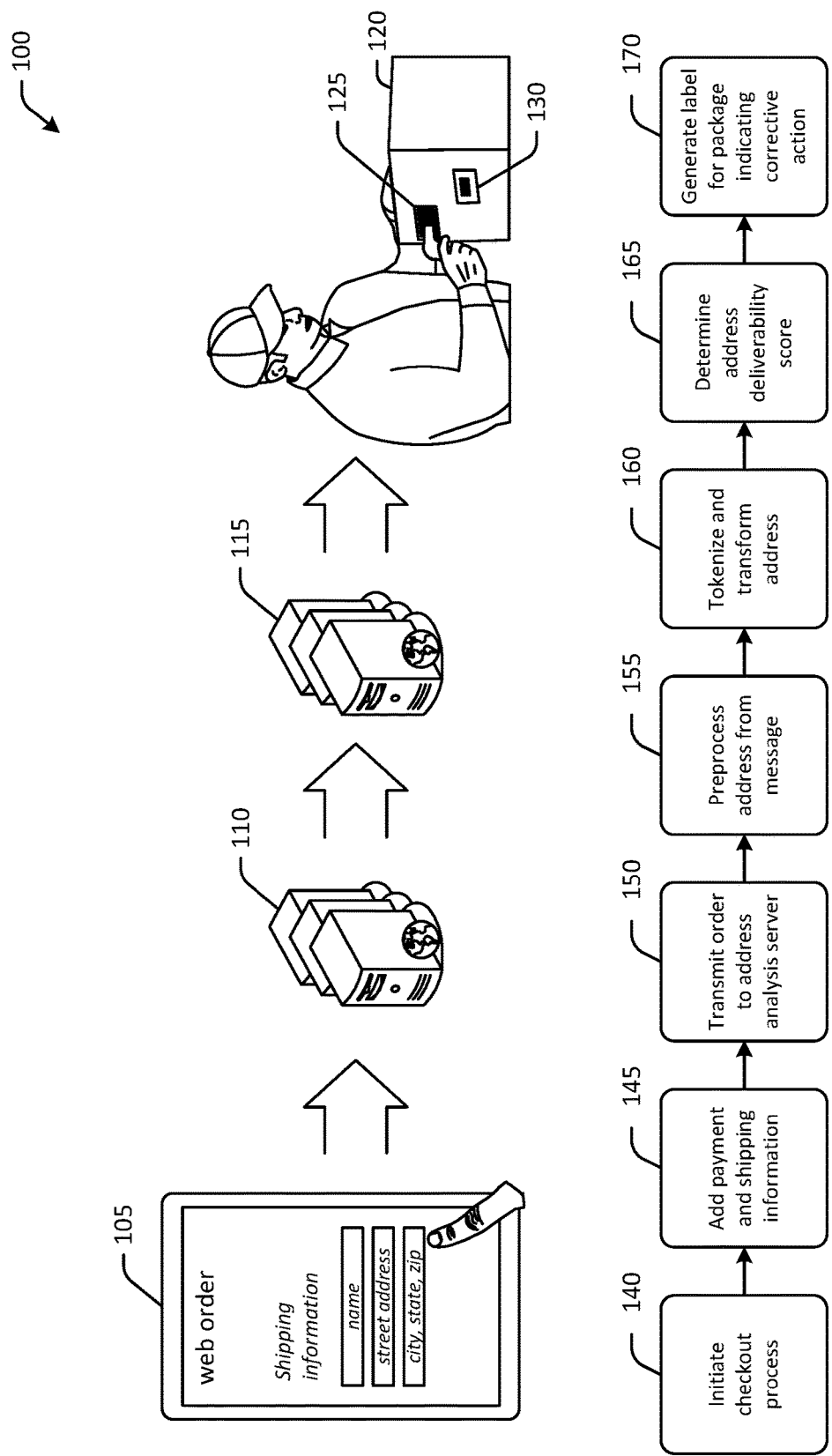
FIG. 1 is a hybrid system and process diagram for identification of inaccurate addresses for package deliveries in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

First Time Delivery Success (FTDS) is a metric for delivery performance and measures the proportion of packages that are successfully delivered to customers on the first attempt. In some embodiments, FTDS may track a package that is dispatched for delivery for the first time from a delivery center and is successfully delivered to the customer.

Along with address, a number of factors may influence the delivery success rate to an address. However, assuming the additional factors are constant, a detailed and well specified address may result in a higher chance of first time delivery success, when compared to an ill-specified address. Estimating the quality of an address by calculating an objective score reflecting the likelihood of a successful delivery for a package may result in improved tracking and success rate for first time delivery success because corrective actions may be taken prior to package delivery attempts.

In some geographic areas, there may not be a standardized format for specifying an address. This may be further complicated by the influence of different languages that may be prevalent in the same geographic area. Delivery failures due to incomplete or un-locatable addresses may together be referred to as failures due to Address Not Found (ANF). Based on delivery address, an address deliverability score may be generated, where a lower score may be indicative of a higher chance of delivery failure due to address issues, such as ANF.

Some example addresses of high delivery failure rate as observed in data.

TABLE 1

Example addresses with Delivery Failure Statuses

| Address | Delivery Status |
| --- | --- |
| Old bus stand, old bus stand, Kurukshetra, Haryana | Customer Rejects |
| Sector 21, Jalvayu vihar, Noida, UP | Customer Not Available |
| Noida, Noida, UP | Address Not Found |
| Delhi, Delhi, Anugul, Orissa | Address Not Found |
| Old railway station, New delhi | Customer Rejects |
| Qaisar Bagh, Qaisar Bagh bus stand, Lucknow | Address Not Found |

If the quality of a delivery address can be accurately estimated via an objective measure, such as an address deliverability score, corrective actions may be identified and implemented to increase the FTDS. For example, if an address deliverability score is below a pre-determined threshold, during pre-checkout of an online retail transaction, the user may be requested to verify an address or may be given suggestions of additional information to add or possible alternative addresses.

In some embodiments, if the address has a very low address deliverability score and the customer does not rectify it before placing the order, a flag may be indicated in the system to sort the package to a separate slot for high delivery risk category. Also, depending on feasibility, it can be indicated to delivery station that the address for the package needs cross checking with the recipient before taking the package out on the road for delivery. For obviously fake or invalid addresses, the corrective action may be to prevent placing the order or blocking a Cash on Delivery payment option.

Referring to FIG. 1, an example use case 100 illustrating identification of inaccurate addresses for package deliveries is depicted in accordance with one or more embodiments of the disclosure. A user may interact with a user device 105 to browse an online retail website and initiate a transaction.

The user may provide information for the transaction, such as payment information and shipping information. The shipping information may include the name and address of the recipient to whom a package should be delivered. The user device 105 may interact with a retail server 110 to complete the transaction. The retail server 110 may communicate with an address analysis server 115 to evaluate the shipping information and generate an address deliverability score to associate with the shipping address. The address deliverability score may be used to initiate a corrective action, such as generating a corrective action label 130 to affix to the package 120, in addition to the shipping label 125 that indicates the shipping address. The corrective action label 130 may be used by a delivery agent to determine actions to take prior to attempting to deliver the package 120. Examples of corrective actions may include, but are not limited to, assigning the package to a high risk delivery category (e.g., which may be assigned to specific delivery agents who have experience delivering in a specific geographic area or with high risk delivery packages that are identified as unlikely to be delivered successfully or delivery time slots designated for packages designated as high risk delivery), requesting additional information, such as address clarification, landmarks or other indications that may be useful in locating an address, or the like, through electronic communication from the user that initiated the online retail transaction or the recipient of the package, an indication for a delivery agent to contact the recipient of the package via a phone call or text message to request additional delivery information, sending a notification to the sender or recipient of the package that a delay in delivery is likely, requesting an alternate shipping address from the sender or the recipient of the package, or the like.

An example process flow for identification of inaccurate addresses for package deliveries, such as those described in FIG. 1, may include initiating, at a user device 105 by a user, a checkout process at a first operation 140. For example, a user may place an order for a book to be delivered to a friend. At operation 145, the user may add payment and shipping information to a web order or online retail transaction. The user may enter a new payment method or may select a previously stored payment method, such as a credit card, checking account, online payment account or the like. The user may enter a new recipient for the package as well as a new shipping address or may select a previously stored recipient and associated shipping address. The user may also indicate the type of shipping (e.g., specify a carrier, speed of delivery, etc.). At operation 150, the user may submit the web order and the user device 105 may transmit the web order to a retail server 110, which may then transmit a message that includes the web order or a portion of the web order, such as the shipping address, to the address analysis server 115. At operation 155, the address analysis server 115 may identify or obtain the shipping address from the message and preprocess the address by standardizing the style and format of the shipping address to generate an address string. At operation 160, the address analysis server 115 may process the address string generated during the preprocessing step by tokenizing and transforming the address into a format capable of being used by a recurrent neural network, such as a set of tokens that are converted to corresponding one-hot encoded vectors by mapping the characters of the token to numeric values (e.g., integers) using a word dictionary that contains such mappings. One-hot encoding is a 1×N matrix (vector) used to distinguish each word in a vocabulary from every other word in the vocabulary. The vector consists of 0s in all cells with the exception of a single 1 in a cell used uniquely to identify the word. At operation 165, the address analysis server 115 may determine an address deliverability score based on the shipping address. For example, the processed shipping address from operation 160 may be provided to a recurrent neural network to generate the address deliverability score. In some embodiments, the one-hot encoded vectors may be fed, in sequence, to a Long Short Term Memory (LSTM) network (e.g., recurrent neural network). The LSTM may convert the one-hot encoded vectors into an abstract multi-dimensional representation, which is then mapped by a logistic function to an address deliverability score. An example embodiment of the conversion by the LSTM network is detailed in relation to FIG. 7.

At operation 170, a corrective action label 130 may be generated and affixed to the package 120. The corrective action label 130 may indicate a corrective action to implement prior to an attempt to deliver the package 120.

The systems, methods, computer-readable media, techniques, and methodologies for identification of inaccurate addresses for package deliveries may result in preventing inaccurate addresses being stored and/or propagated across databases or computer systems, and may improve a customer experience by preventing delayed package delivery due to inaccurate addresses. In some embodiments, machine learning and/or algorithms may be executed in real-time to determine an address deliverability score to use to increase the likelihood of a successful package delivery. Certain embodiments may implement or execute corrective actions after determining that an address is inaccurate based on the address deliverability score.

Example embodiments of the disclosure provide a number of technical features or technical effects. For example, in accordance with example embodiments of the disclosure, certain embodiments of the disclosure may generate probability values indicative of a likelihood that a package status entry or update is inaccurate. Certain embodiments may cause one or more response actions to be executed in response to determining that a package status entry or update is inaccurate, such as causing one or more operations to be executed at a user device and/or one or more notifications to be generated or replaced and sent to various user accounts. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
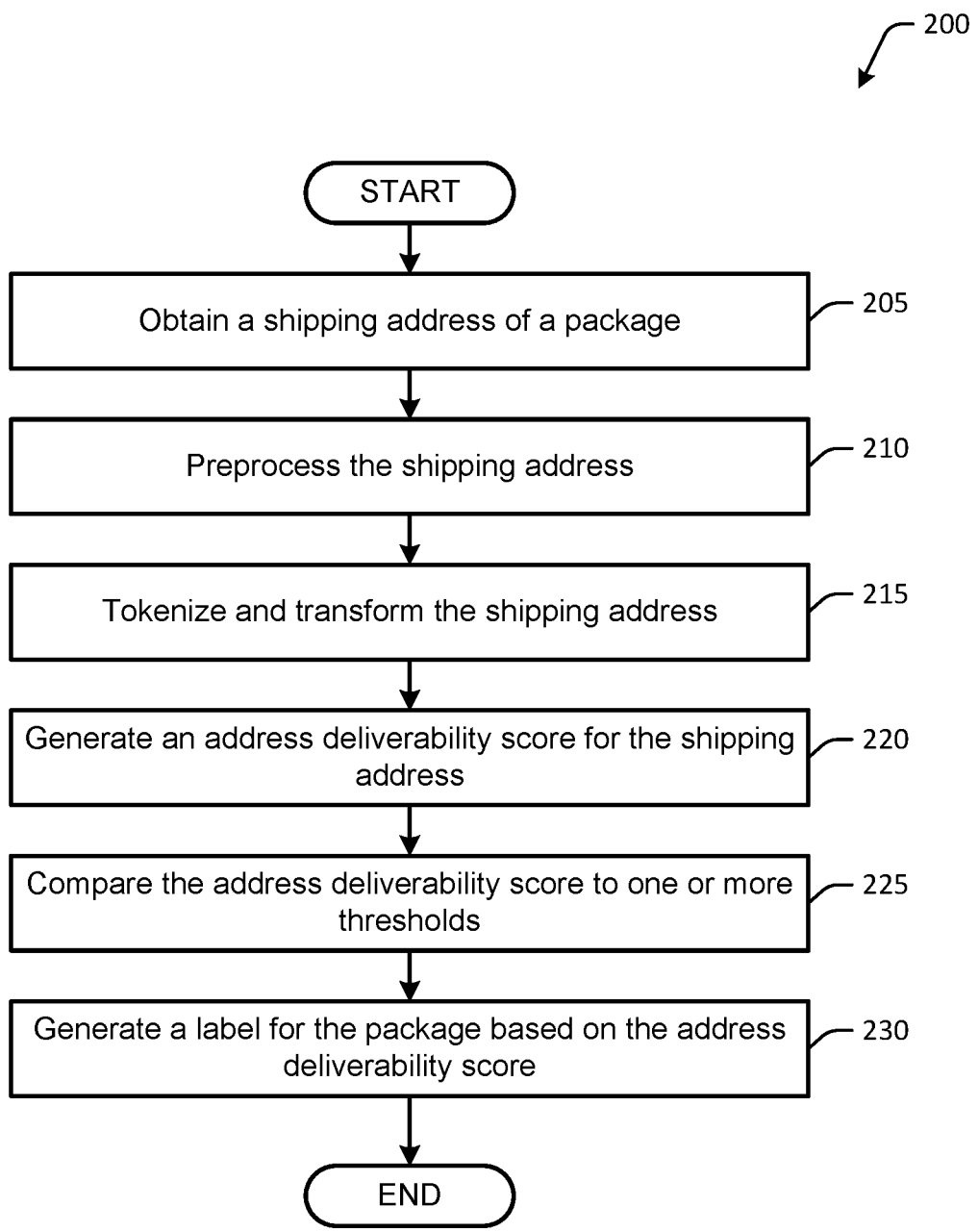
FIG. 2 is an example process flow diagram for identification of inaccurate addresses for package deliveries in accordance with one or more embodiments of the disclosure.

Referring to FIG. 2, an example process flow diagram 200 for identification of inaccurate addresses for package deliveries in accordance with one or more embodiments of the disclosure is depicted. Although certain operations are illustrated as occurring separately in FIG. 2, some or all of the operations may occur concurrently or partially concurrently across one or more computer systems. One or more operations may be optional in FIG. 2. At block 205, the address analysis server 115 may obtain a shipping address of a package 120. In some embodiments, the address analysis server 115 may receive a message from a retail server 110, which may include a web order or a portion of an online retail transaction. In some embodiments, the message may include a location of a shipping address for the address analysis server 115 to obtain.

At block 210, the address analysis server 115 may preprocess the shipping address. In some embodiments, the shipping address may include multiple lines. For example, the shipping address may include a line for a business or residence name, a line for the street address, and a line for the city, state, zip, and/or country. In some embodiments, the lines of the shipping address may be concatenated into a single string. In some embodiments, the lines of the shipping address may be cleaned up by removing extraneous spaces or symbols. The characters of the string may be converted to the same case (e.g., all upper case, all lower case, etc.). In some embodiments, symbols may be inserted to indicate the different lines of the address (e.g., semicolon or colon between the different lines).

At block 215, the address analysis server 115 may tokenize and transform the shipping address. In some embodiments, the address analysis server 115 may parse the string from block 210 into tokens (e.g., each token may correspond to a different field of the address) and may convert the characters to corresponding numeric values. In some embodiments, a word dictionary may be identified and used to map the text to an integer based on an index of the word dictionary.

At block 220, the address analysis server 115 may use the tokenized and transformed shipping address to generate an address deliverability score for the shipping address. The address analysis server 115 may use a recurrent neural network (e.g., LSTM) to generate the address deliverability score. A recurrent neural network is a class of artificial neural network designed to recognize patterns in sequences of data, such as text, genomes, handwriting, the spoken word, or the like. The purpose of recurrent neural networks is to accurately classify sequential input. The classification of the sequential input by the recurrent neural network may be outputted as a multi-dimensional representation that may be mapped to an address deliverability score for a shipping address. The address deliverability score is indicative of a likelihood of successful package delivery. In some embodiments, the address deliverability score may be a number between 1 and 1000 (or any other predetermined number).

At block 225, the address analysis server 115 may compare the address deliverability score to one or more thresholds. The thresholds may be predetermined points on the scale that may correspond to different corrective measures. For example, on the address deliverability score there may be a number on a scale of 0-1000, where a higher value is indicative of a greater likelihood for a successful package delivery. An administrator may set predetermined thresholds. In some embodiments, the predetermined thresholds may be determined by machine learning algorithms using historic package delivery data for an identified date range and/or population. In one embodiment, on a scale of 1 to 1000, a predetermined threshold may be set at 800, which may indicate that an address deliverability score that is above 800 does not need any type of corrective action and the package may be scheduled for delivery without any intervention. Another predetermined threshold may be set for a score range of 400-800. Corrective actions may be associated with the predetermined threshold, such as automatically generating an electronic communication to request address clarification or additional information (e.g., specific driving directions to reach the shipping address, identification of landmarks or sign posts that may be used to locate the address, etc.), assigning the package to a high risk delivery category, or the like. If the package is assigned to a high risk delivery category, additional corrective actions may be associated with score range, such as assigning the package for delivery by a specific delivery agent who may have more experience in locating inaccurate addresses or a delivery agent that has greater experience in the identified region. In some embodiments, the predetermined threshold or score range is set to below 400, or 0 to 400, and one or more corrective actions may be associated with the predetermined threshold or score range. For example, the corrective action may be to prevent completion of the online retail transaction associated with the package or removing certain type of payment options, such as cash on delivery.

In some embodiments, a set of corrective actions may be associated with an identified predetermined threshold or score range. The address deliverability score and set of corrective actions may be presented to an administrator of the system, who may then select one of the corrective actions form the set of corrective actions. The system may receive the indication of the selection and facilitate implementation of the corrective action selected. At block 230, a corrective action label 130 may be generated for the package 120 based on the address deliverability score. In some embodiments, the corrective action label 130 may be a label of a specific color or indicating a category or word to signal to a delivery agent that an action should be taken prior to attempted package delivery. In some embodiments, the corrective action label 130 may list the one or more corrective actions and corresponding codes so that once they are implemented, the actions and their results may be recorded and stored in association with a status of the package delivery.

Figure 3:
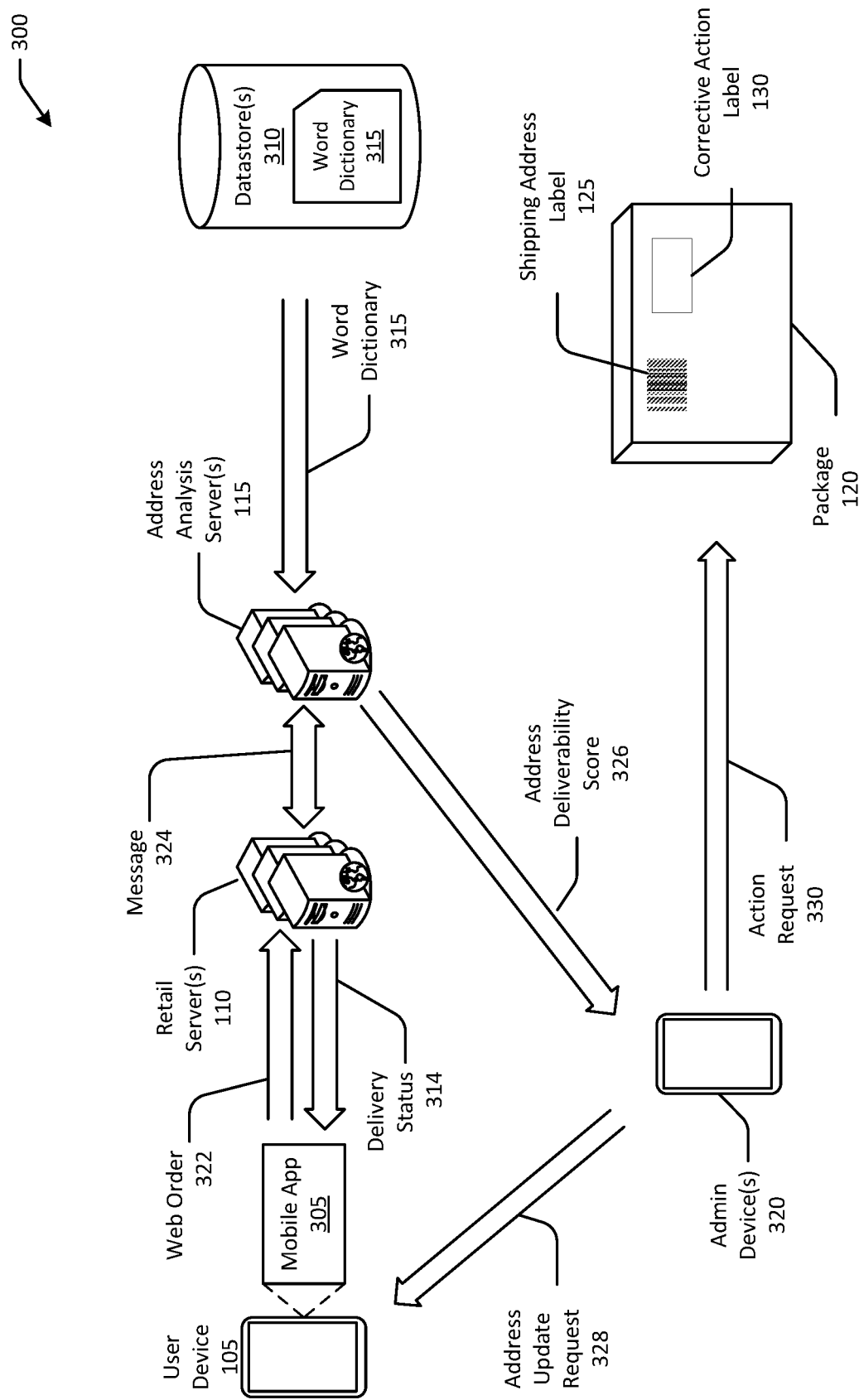
FIG. 3 is a schematic hybrid system/data flow diagram depicting various illustrative data communications between components of the system architecture depicted in FIG. 1 as part of a process for identification of inaccurate addresses for package deliveries in accordance with one or more example embodiments of the disclosure.

Now referring to FIG. 3, a schematic hybrid system/data flow diagram 300 depicts various illustrative data communications between components of the system architecture depicted in FIG. 1 as part of a process for identification of inaccurate addresses for package deliveries in accordance with one or more example embodiments of the disclosure.

A user device 105 may have a web browser or a dedicated mobile application 305 for completing an on line transaction, such as a retail transaction, which requires delivery of a package 120. The user of the user device 105 may initiate checkout process for the product to be delivered. The user device 105 may obtain payment and shipping information for the transaction. For example, the user device 105 may receive an indication for a new payment method or may retrieve a previously stored payment method. The user device 105 may receive an indication of a new recipient and associated shipping address or may retrieve a previously stored data for a recipient and shipping address. The user device 105 may submit the retail transaction or web order 322, which may be transmitted to a retail server 110. The retail server 110 may process the web order 322 and may determine to transmit the shipping address of the web order 322 for analysis. The retail server 110 may transmit a message 324 comprising the web order 322 or a portion of the web order 322 (e.g., shipping address) to an address analysis server 115.

The address analysis server 115 may determine the shipping address from the message 324 and may determine to initiate preprocessing of the shipping address by, for example, a preprocessing module. In some embodiments, preprocessing of the shipping address may include concatenating the different lines of the shipping address and generating an address string. The characters of the address string may be converted to all uppercase or all lowercase.

The white space characters (e.g., such as a space or a return character) of the address string may be removed. In some embodiments, the address analysis server 115 may identify or determine a word dictionary 315 to use for processing the address string. In some embodiments, the word dictionary 315 may be determined using the words of the shipping address or address string (e.g., language, dialect, etc.). Word dictionary 315 may be retrieved from a datastore 310 that stores one or more word dictionaries 315. In an example embodiment, a word dictionary 315 may have 170 words, organized into 132 groups, with words in a group sharing the same representation. A word group may be defined as set of words which have the same linguistic and usage variations. The words in the word dictionary 315 may be mapped to specific integers for converting text to numbers.

The address analysis server 115 may process the address string. In some embodiments, the address analysis server 115 may tokenize and transform the address string. In some embodiments, the address string may be split or parsed into a sequence of words or tokens. Then each word or token in the sequence may be mapped to an integer, based on an index of an identified word dictionary 315 using the received word dictionary 315. If a word or token is not present in the word dictionary 315, then it is analyzed to detect the presence of numbers, alphabets & non-alpha-numeric characters. Using these three character categories, such a word or token may be abstractly coded. Choice of words to use in the dictionary and size of the word dictionary 315 may control the amount of detail that is recognized by the address analysis server 115 and may also have an influence on its generalization ability. The output of the processing of the address string may be a set of vectors that include the numeric encoding from the processed address string.

Figure 7:
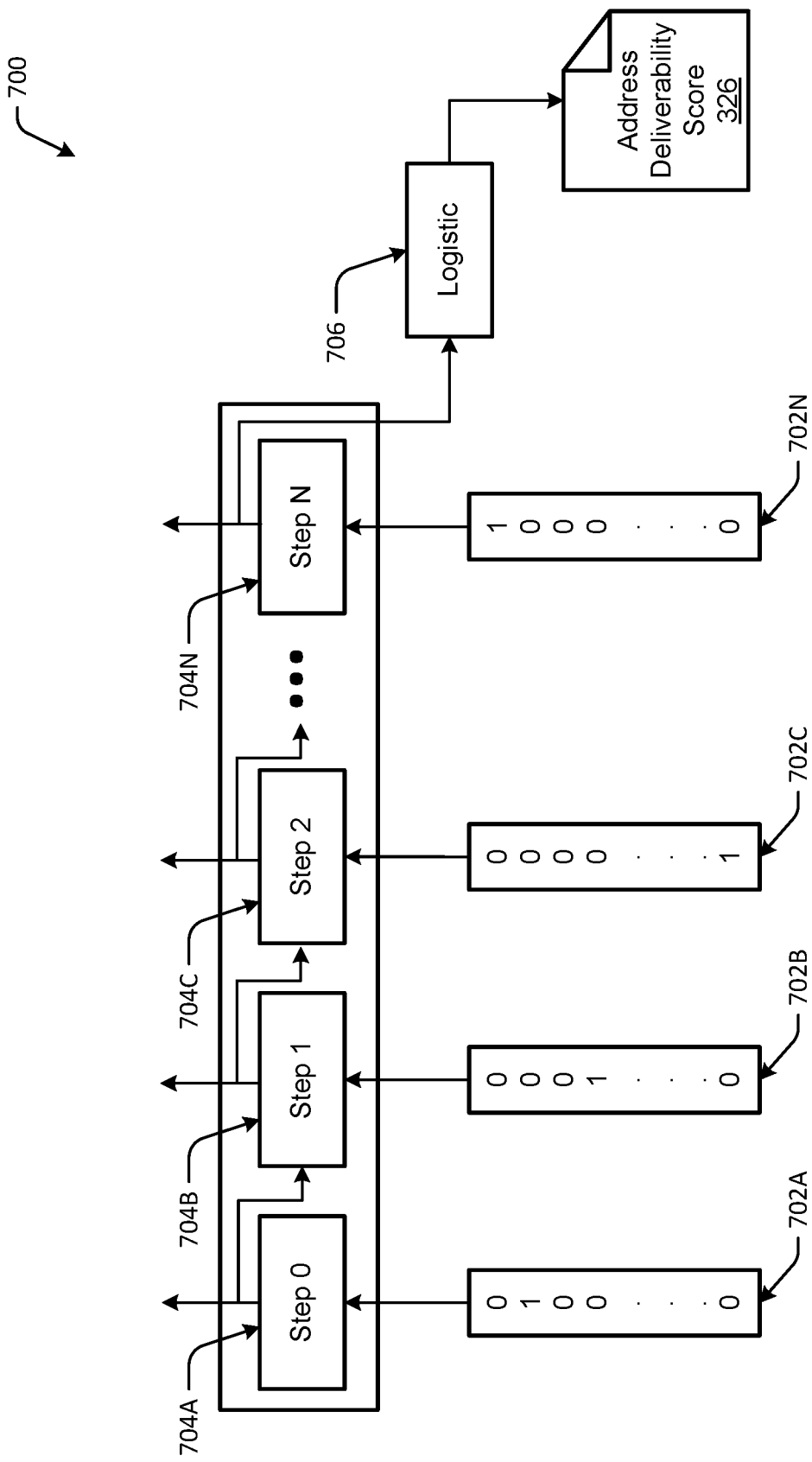
FIG. 7 is an example diagram depicting a scoring module for identification of inaccurate addresses for package deliveries in accordance with one or more embodiments of the disclosure.

In some embodiments, the set of vectors may be provided to a recurrent neural network, such as a Long Short Term Memory, to generate an address deliverability score 326 as further described with regards to FIG. 7. The address deliverability score 326 may be transmitted to, for example, an administrative (admin) device 320, such as a laptop, computer, smartphone, tablet, or the like, for an administrator to view and select a corrective action for the package delivery. In some embodiments, the admin device 320 may receive the address deliverability score 326 and may determine one or more corrective actions based on the address deliverability score 326. For example, the admin device 320 may compare the address deliverability score 326 to one or more predetermined thresholds. The predetermined thresholds may be values on the scale of address deliverability that are associated with specific corrective actions. In some embodiments, the corrective actions may have been designated by an administrator of the system to associate with a score range of address deliverability. In some embodiments, the corrective actions may be determined through machine learning, where historic delivery behaviors are analyzed and successful corrective actions are identified that resulted in a higher success rate for package delivery. Predetermined thresholds and associated corrective actions may be set by an administrator of the system or may be dynamically adjusted based on historic information associated with package deliveries in an identified date range. Examples of corrective actions may include an address update request 328 or request for additional information. In some embodiments, corrective actions may include, but are not limited to, assigning the package to a high risk delivery category (e.g., which may be assigned to specific delivery agents or delivery time slots), requesting additional information through electronic communication from the user that initiated the online retail transaction or the recipient of the package, an indication for a delivery agent to contact the recipient of the package via a phone call or text message to request additional delivery information, sending a notification to the sender or recipient of the package that a delay in deliver is likely, requesting an alternate shipping address from the sender or the recipient of the package, or the like. In some embodiments, the correction action label 130 may be the corrective action, wherein the label is a specific color, depicts a specific symbol, image, word, character, or the like to indicate that the package should be classified in a high risk delivery category.

In some embodiments, predetermined thresholds or score ranges may be associated with one or more corrective actions and if the address deliverability score falls within the score range or satisfies the predetermined threshold, the one or more corrective actions may be presented to a user of the system. Once a selection of a corrective action has been made, the system may facilitate implementation of the selected corrective action. For example, the address deliverability score may be a number on a scale of 0-1000, where a higher value is indicative of a greater likelihood for a successful package delivery. In one embodiment, on a scale of 1 to 1000, a predetermined threshold may be set at 800, which may indicate that an address deliverability score that is above 800 does not need any type of corrective action and the package may be scheduled for delivery without any intervention. Another predetermined threshold may be set for a score range of 400-800. Corrective actions may be associated with the predetermined threshold, such as automatically generating an electronic communication to request address clarification or additional information (e.g., specific driving directions to reach the shipping address, identification of landmarks or sign posts that may be used to locate the address, etc.), assigning the package to a high risk delivery category, or the like. If the package is assigned to a high risk delivery category, additional corrective actions may be associated with score range, such as assigning the package for delivery by a specific delivery agent who may have more experience in locating inaccurate addresses or a delivery agent that has greater experience in the identified region. In some embodiments, the predetermined threshold or score range is set to below 400, or 0 to 400, and one or more corrective actions may be associated with the predetermined threshold or score range. For example, the corrective action may be to prevent completion of the online retail transaction associated with the package or removing certain type of payment options, such as cash on delivery.

In some embodiments, a set of corrective actions may be associated with an identified predetermined threshold or score range. The address deliverability score and set of corrective actions may be presented to an administrator of the system, who may then select one of the corrective actions form the set of corrective actions. The system may receive the indication of the selection and facilitate implementation of the corrective action selected.

The request may be sent to the user device 105 initiating the web order 322 or may be sent to a user device 105 of the recipient. Follow-up requests may be scheduled based on the initial request 328.

In some embodiments, the corrective action may be an action request 330 such as generating an additional label, such as a corrective action label 130 to affix to the package 120. In some embodiments, the corrective action label 130 may be a label of a specific color or include a specific character/word/number to indicate to a delivery agent that the package should be subject to a specific corrective action procedure, such as assignment to a specific delivery agent, assignment to a specific delivery date, or the like. In some embodiments, the corrective action label 130 may list corrective actions for the delivery agent, such as calling the recipient to arrange a specific delivery time, request additional delivery instructions, or the like.

In some embodiments, the delivery agent or mechanism of the tracking system may update the retail server 110 of the package status and a delivery status 314 may be transmitted to the user device 105 requesting the package delivery.

Figure 4:
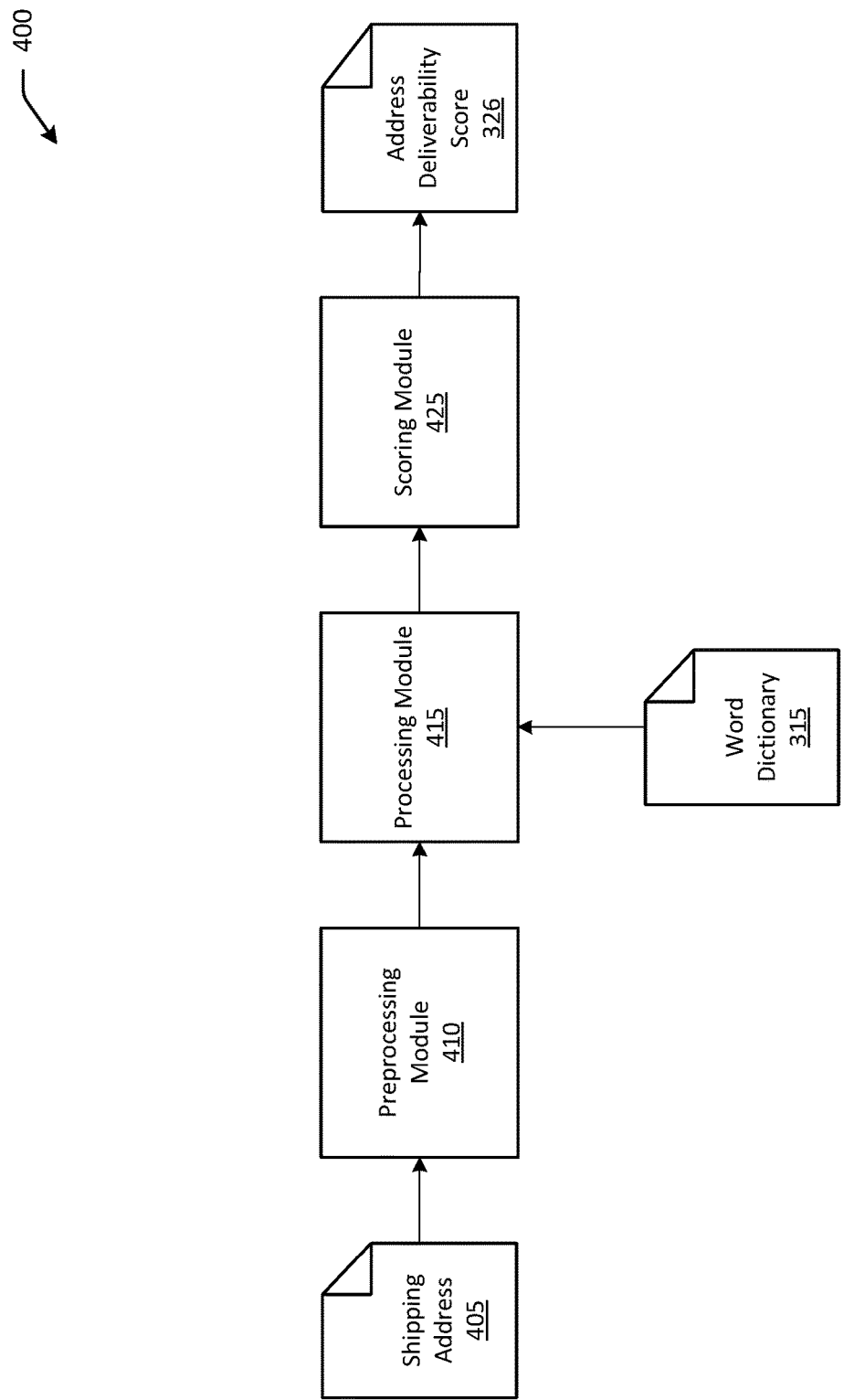
FIG. 4 is an example diagram depicting a data flow for identification of inaccurate addresses for package deliveries in accordance with one or more embodiments of the disclosure.

Now referring to FIG. 4, depicted is an example diagram of a data flow 400 for identification of inaccurate addresses for package deliveries in accordance with one or more embodiments of the disclosure. In some embodiments, a shipping address 405 may be provided to a preprocessing module 410. The shipping address 405 may be received in a message from a retail server 110 and may be identified from the message. In some embodiments, the shipping address 405 may be obtained from a location identified in the message, such as a remotely stored table or other type of data structure for previously stored shipping addresses or address books. The preprocessing module 410 may generate an address string based on the shipping address 405. In some embodiments, the shipping address 405 may be cleaned and converted to the same case (e.g., upper case, lower case, etc.) and may be concatenated to form an address string. The address string may be transmitted to the processing module 415. The processing module 415 may identify a word dictionary 315 based on the address string. In some embodiments, the processing module 415 may identify multiple related word dictionaries 315 and may rank the dictionaries 315 and select the word dictionary with the highest ranking, which may be based on language, dialect, geographic region, etc. The processing module 415 may parse the address string into a set of tokens or set of words. In some embodiments, the processing module 415 may parse the tokens based on identified marking characters (e.g., colon, semicolon, etc.) or based on identification of words using the word dictionary 315. The processing module 415 may convert the set of tokens or set of words into vectors using the word dictionary 315. In some embodiments, the vectors may be one-hot encoded vectors. In some embodiments, the maximum number of words that may be supported in an address may be a preset number (e.g., 20 words). Shipping addresses 405 that are larger than the preset number may be truncated while those that are shorter may be padded with dummy tokens. The vectors generated by the processing module 415 may be transmitted to the scoring module 425.

The scoring module 425 may receive the vectors and may input the vectors to the recurrent neural network, such as a Long Short Term Memory network, to generate an address deliverability score 326. The scoring module 425 may convert the input vectors to an abstract multi-dimensional representation, which may then be mapped by a logistic function to an address deliverability score 326. The address deliverability score 326 may be provided to an admin device 320 or the like.

Figure 5:
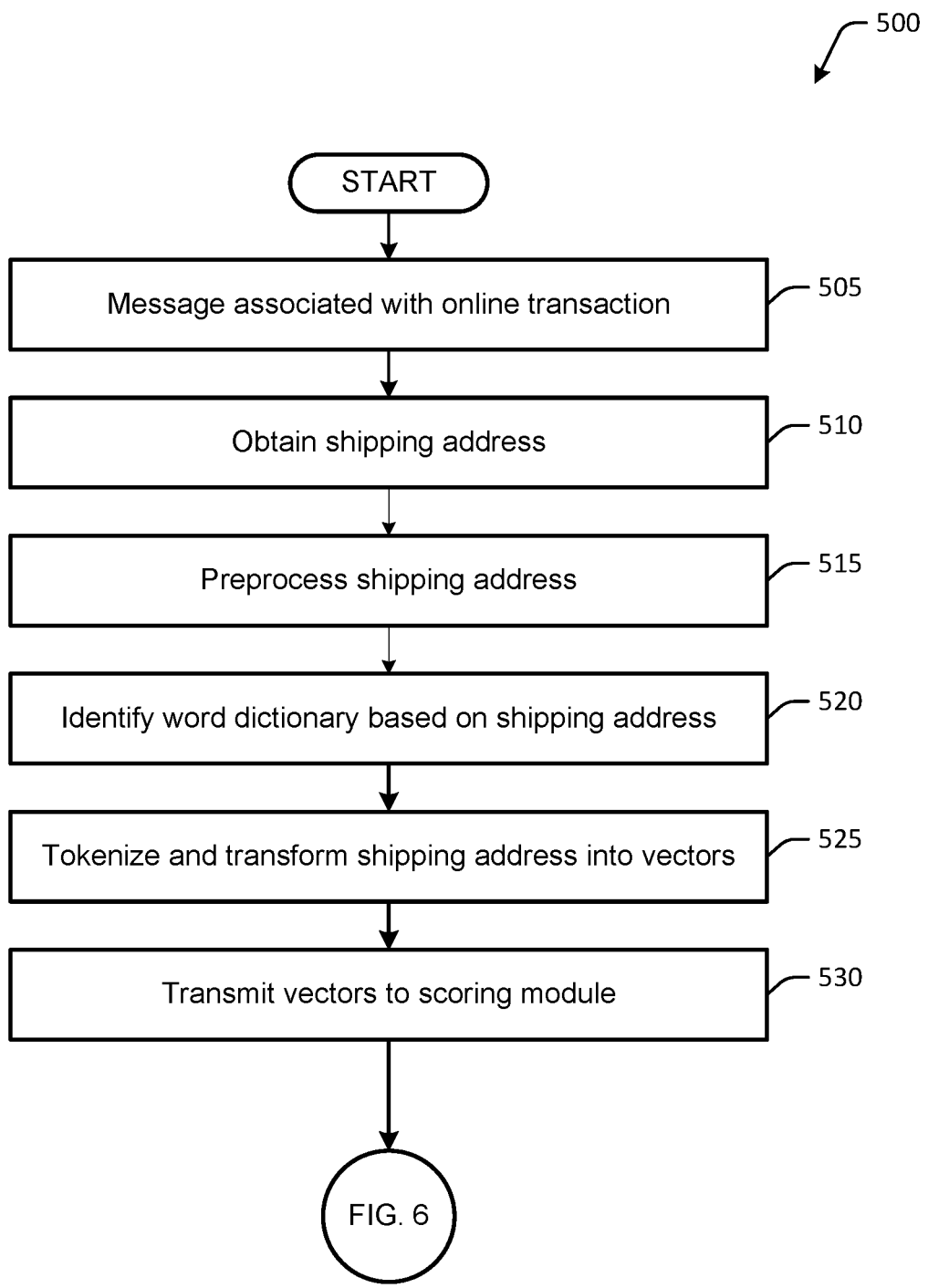
FIG. 5 is an example process flow diagram for identification of inaccurate addresses for package deliveries in accordance with one or more embodiments of the disclosure.

Now referring to FIG. 5, depicted is an example process flow diagram 500 for identification of inaccurate addresses for package deliveries in accordance with one or more embodiments of the disclosure. At block 505, a message associated with an online transaction may be received. In some embodiments, the message may be received from a retail server 110 and may include details from an online transaction, such as the name of a recipient and a shipping address or a location of the shipping address. At block 510, the address analysis server 115 may obtain the shipping address from the message. In some embodiments, the shipping address may be parsed and identified from the message. In some embodiments, the message may indicate a location of the shipping address and the address analysis server 115 may obtain the shipping address using the location indicated in the message.

At block 515, the shipping address may be transmitted to a preprocessing module 410 for preprocessing. In some embodiments, one or more rules may be applied to the shipping address to standardize or clean up the shipping address for further processing. For example, abbreviations may be expanded (e.g., Rd. may be replaced with Road), substitutions may be made (e.g., "Apt. #123" may be replaced with "Unit 123"), and the like. In some embodiments, if the address has multiple lines, the different lines may be concatenated into a single string (e.g., address string). In some embodiments, the different lines may be separated in the string by a symbol (e.g., semicolon, colon, etc.). In some embodiments, the different fields may be separated by a symbol (e.g., [city]:[state]:[zip code]:[country]).

At block 520, a word dictionary 315 may be identified based on the shipping address 405 or the address string. In some embodiments, multiple word dictionaries 315 may be identified as relevant. The word dictionaries 315 may be ranked based on relevance (e.g., number of matching words) and a word dictionary 315 may be selected based on the ranking.

At block 525, the shipping address may be tokenized and transformed into vectors. For example, the address string may be analyzed and parsed into a set of tokens and/or words. The tokens and/or words may be transformed into numeric values using the identified word dictionary 315 to form vectors (e.g., numeric representations of the text). For example, the token or words may be identified in an index of a word dictionary indicating a numeric value, such as an integer, for the word. The word or token may then be replaced by the numeric value identified in the word dictionary to form a vector. The vectors may be transmitted to the scoring module 425 at block 530.

Figure 6:
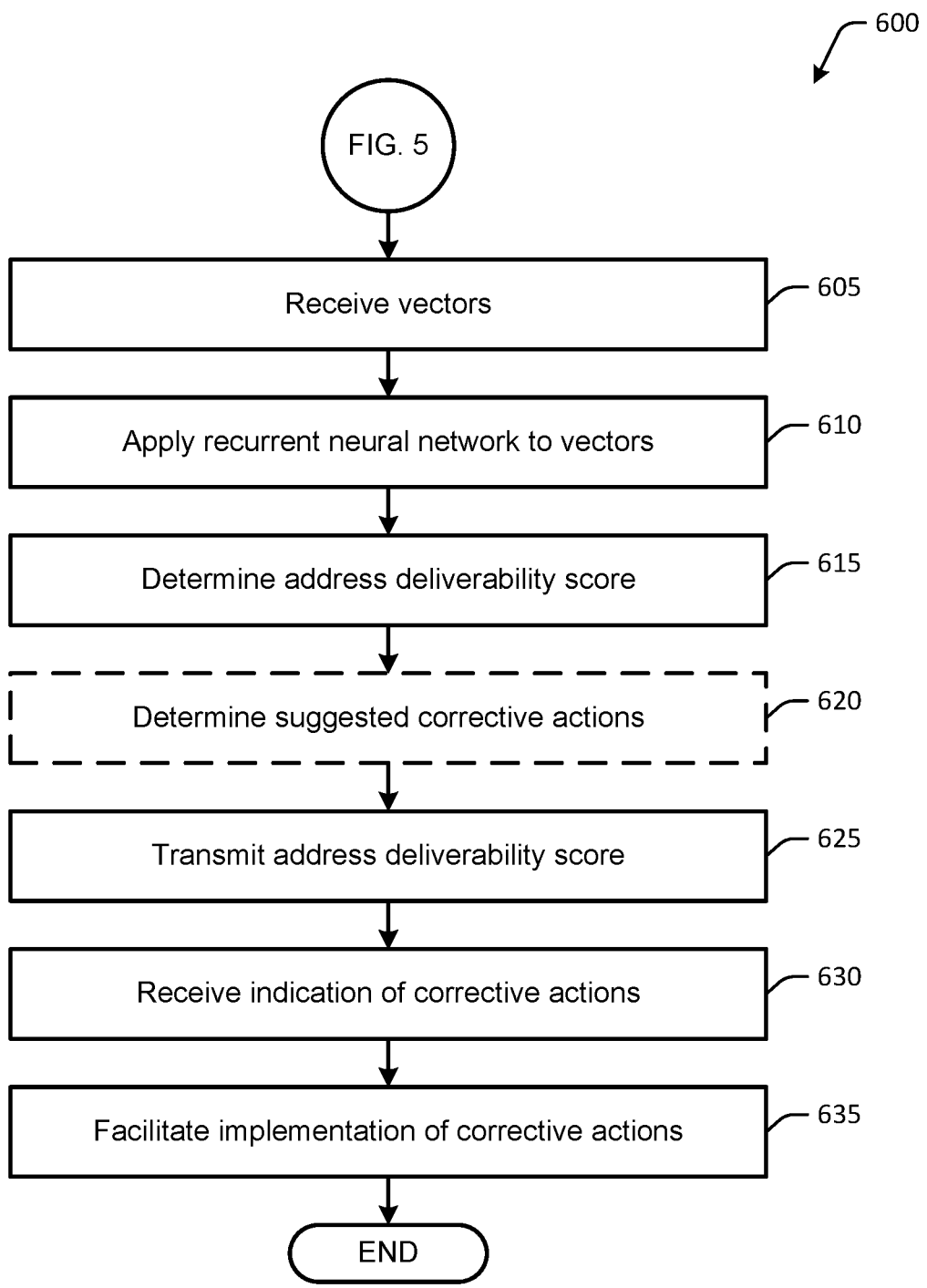
FIG. 6 is an example process flow diagram for identification of inaccurate addresses for package deliveries in accordance with one or more embodiments of the disclosure.

Continuing on to FIG. 6, depicted is an example process flow diagram 600 for identification of inaccurate addresses for package deliveries in accordance with one or more embodiments of the disclosure. At block 605, the scoring module 425 may receive the set of vectors. At block 610, the recurrent neural network may be applied to the set of vectors (as further described in FIG. 7).

At block 615, the scoring module 425 may determine an address deliverability score 326. At optional block 620, suggested corrective actions may be identified based on the address deliverability score 326. For example, suggested corrective actions may be associated with a range on the scale of address deliverability. If the address deliverability score 326 falls within a predetermined range (e.g., between 300-400 on a scale of 1 to 1000), then the associated suggested corrective actions may be identified and transmitted with the address deliverability score 326 at block 625. In some embodiments, the address deliverability score 326 (and applicable suggestive corrective actions) may be displayed on an admin device 320. At block 630, the admin device 320 may receive an indication of a selection of a corrective action. In some embodiments, the selection may be of a single action or multiple corrective actions. At block 635, implementation of the corrective actions may be facilitated. For example, if the corrective action is to request additional information from the recipient, the contact number may be provided along with a user interface on the admin device 320 to capture notes regarding the additional information. In some embodiments, the corrective action may be affixing a specific corrective action label 130 to a package 120, and the label may be generated and sent to a package processing worker to affix the label to the package 120.

Referring to FIG. 7, an example diagram depicting a scoring module architecture 700 for identification of inaccurate addresses for package deliveries in accordance with one or more embodiments of the disclosure is depicted. The scoring module 425 that is used in determining the address deliverability score 326 may be, for example, an N-time step Long Short Term Memory (LSTM) module followed by a Logistic unit 706. LSTM is a special kind of recurrent neural network capable of learning long term dependencies in time and may convert the one-hot encoded vectors 702A-702N (collectively 702) to a multi-dimensional representation, which is then mapped by the Logistic unit 706 to an address deliverability score 326.

The scoring module 425 may utilize a recurrent neural network to classify sequential input (e.g., one-hot encoded vectors derived from an identified shipping address). The classification of the sequential input by the recurrent neural network may be outputted as a multi-dimensional representation that is mapped to an address deliverability score 326 for a shipping address.

LSTM may contain information outside the normal flow of the recurrent network in a gated cell. Information can be stored in, written to, or read from a cell. The cell may make decisions about what to store, and when to allow reads, writes and erasures, via gates (e.g., forget gates, input gates, and output gates). The gates act on the one-hot encoded vectors 702 that are provided as input at each time step 704A-704N (collectively 704) and can block or pass on information based on its strength and import, which they filter with their own sets of weights. Those weights are adjusted via the recurrent networks learning process (e.g., the cells learn when to allow data to enter, leave or be deleted through the iterative process of making guesses, backpropagating errors, and adjusting weights via gradient descent).

The LSTM network may include a memory cell, also known as cell state. Writing to and reading from the cell is controlled by structures called gates. As the LSTM processes the input data (e.g., vectors 702A-702N, collectively 702) in sequence, its cell state is updated at each time step 704A-704N, collectively 704. FIG. 7 depicts scoring module 425 with LSTM unwrapped for N time steps. Input gate controls the amount of influence that a new input (e.g., vector 702) will have on cell contents, from one time step to the next, while forget gate smoothly controls the amount of information that should be retained in cell state, from one time step to the next. Output from LSTM is a filtered version of cell state, controlled by output gate. LSTM update equations are given below:

$$C_t = f_t * C_{t-1} + i_t * \tilde{C}_{t-1}$$ State update equation:

$$f_t = \sigma(W_f \odot [h_{t-1}, x_t] + b_f)$$ Forget gate:

$$i_t = \sigma(W_i \odot [h_{t-1}, x_t] + b_i)$$ Input gate:

$$o_t = \sigma(W_o \odot [h_{t-1}, x_t] + b_o)$$ Output gate:

$$h_t = o_t \odot \tan h(C_t)$$ Output equation:

Here $C_t$, $x_t$, $h_t$ denotes cell state, input and output of LSTM at time t. W & b are weight and bias parameters for internal gates of LSTM, indicated by their subscripts. Training of scoring module 425 may involve learning parameters for gates inside LSTM as well as weights of logistic unit at the output stage.

In the example depicted in FIG. 7, a one-hot encoded vector 702A may be provided to time step 704A. Each of its three gates will decide how the input will be handled. Within the time step, the three gates (e.g., forget gate, input gate, output gate) determine respectively whether to let new input in, erase the present cell state, and/or let that state impact the network's output at the present time step. Information from time step 704A may then be provided to time step 704B in addition to the next sequential one-hot encoded vector 702B. By providing cell state information from a previous time step 704, a constant error can be preserved when it must be backpropagated at depth. This processing may continue until the last time step 704N, at which point a multi-dimensional representation of the conversion of the set of vectors 702 provided to the scoring module may be provided to the Logistic unit 706. The Logistic unit 706 may then map the representation to a numeric value that is the address deliverability score 326.

In some embodiments, locality and sub-locality detection, coupled with infusion of that knowledge into features may improve accuracy. Additionally, the systems and methods described herein may be directed to building separate models for differently categorized cities, instead of one single model for all cities.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
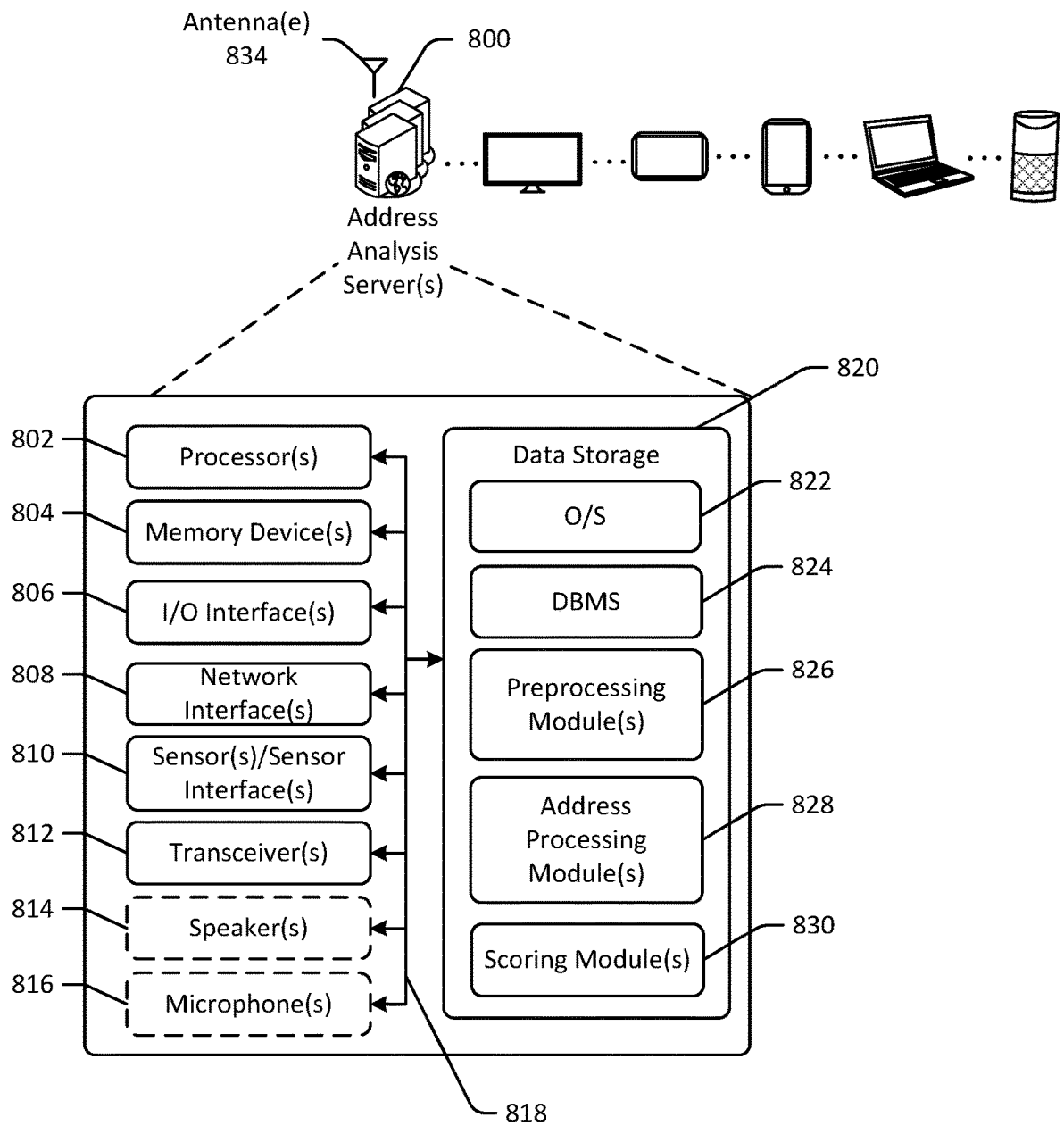
FIG. 8 schematically illustrates an example architecture of an address analysis server in accordance with one or more embodiments of the disclosure.

FIG. 8 is a schematic block diagram of one or more illustrative address analysis server(s) 800 in accordance with one or more example embodiments of the disclosure. The address analysis server(s) 800 may include any suitable computing device including, but not limited to, a server system, a mobile device such as a smartphone, a tablet, an e-reader, a wearable device, or the like; a desktop computer; a laptop computer; a content streaming device; a set-top box; or the like. The address analysis server(s) 800 may correspond to an illustrative device configuration for the address analysis servers of FIGS. 1-7.

The address analysis server(s) 800 may be configured to communicate via one or more networks with one or more servers, user devices, or the like. The address analysis server(s) 800 may be configured to determine a shipping address, preprocess the shipping address, tokenize and transform the shipping address, generate an address deliverability score, and suggest corrective actions based on the address deliverability score.

The address analysis server(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the address analysis server(s) 800 may include one or more processors (processor(s)) 802, one or more memory devices 804 (generically referred to herein as memory 804), one or more input/output (I/O) interfaces 806, one or more network interfaces 808, one or more sensors or sensor interfaces 810, one or more transceivers 812, one or more optional speakers 814, one or more optional microphones 816, and data storage 820. The address analysis server(s) 800 may further include one or more buses 818 that functionally couple various components of the address analysis server(s) 800. The address analysis server(s) 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the address analysis server(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the address analysis server(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more preprocessing module(s) 826, one or more address processing module(s) 828, and/or one or more scoring module(s) 830. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by components of the address analysis server(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, an example datastore(s) may include, for example, web content, advertisement campaigns, advertisements, content items, and/or other information.

The processor(s) 802 may be configured to access the memory 804 and execute computer-executable instructions loaded therein. For example, the processor(s) 802 may be configured to execute computer-executable instructions of the various program module(s), applications, engines, or the like of the address analysis server(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the preprocessing module(s) 826 may include computer-executable instructions, code, or the like that responsive to execution by one or more of the processor(s) 802 may perform functions including, but not limited to, receiving one or more shipping addresses and performing preprocessing on the shipping address. Preprocessing may include, for example, cleaning the shipping addresses of any typos or extraneous characters, concatenating the lines of the shipping address into an address string and converting the characters to lowercase characters. The preprocessing module 826 may transmit the address string to the address processing module 828.

The address processing module(s) 828 may include computer-executable instructions, code, or the like that responsive to execution by one or more of the processor(s) 802 may perform functions including, but not limited to, receiving the address string, and identifying a word dictionary associated with the address string. The address string may be split into a sequence of words/tokens. Then each word/token in this sequence may be mapped to an integer, based on its index of the identified word dictionary. If a word/token is not present in the dictionary, then it is analyzed to detect the presence of numbers, alphabets & non-alpha-numeric characters. Using these three categories of characters, such a word/token is abstractly coded. The output of the address processing module is a set of numeric vectors that are transmitted to the scoring module 830 to generate an address deliverability score.

The scoring module(s) 830 may include computer-executable instructions, code, or the like that responsive to execution by one or more of the processor(s) 802 may perform functions including, but not limited to, generating an address deliverability score. In some embodiments, the scoring module 830 may apply a recurrent neural network to the one or more shipping addresses to obtain the address deliverability score. In some embodiments, the scoring module 830 may receive a set of vectors that provided to the recurrent neural network to generate an address deliverability score. The address deliverability score may be provided to the retail server 110 or an administrative device 320, which may identify and facilitate implementation of corrective actions based on the address deliverability score.

Referring now to other illustrative components depicted as being stored in the data storage 820, the O/S 822 may be loaded from the data storage 820 into the memory 804 and may provide an interface between other application software executing on the address analysis server(s) 800 and the hardware resources of the address analysis server(s) 800. More specifically, the O/S 822 may include a set of computer-executable instructions for managing hardware resources of the address analysis server(s) 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the address analysis server(s) 800 is a mobile device, the DBMS 824 may be any suitable lightweight DBMS optimized for performance on a mobile device.

Referring now to other illustrative components of the address analysis server(s) 800, the input/output (I/O) interface(s) 806 may facilitate the receipt of input information by the address analysis server(s) 800 from one or more I/O devices as well as the output of information from the address analysis server(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the address analysis server(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The address analysis server(s) 800 may further include one or more network interface(s) 808 via which the address analysis server(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(e) 834 may include any suitable type of antenna depending, for example, on the communications protocols used to transmit or receive signals via the antenna (e) 834. Non-limiting examples of suitable antennae may include directional antennae, non-directional antennae, dipole antennae, folded dipole antennae, patch antennae, multiple-input multiple-output (MIMO) antennae, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the address analysis server(s) 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the address analysis server(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 814 may be any device configured to generate audible sound. The microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the address analysis server(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the address analysis server(s) 800 may include alternate and/or additional hardware, software, or firmware components beyond those described or depicted without departing from the scope of the disclosure. More particularly, it should be appreciated that software, firmware, or hardware components depicted as forming part of the address analysis server(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   receiving, by one or more computer processors coupled to at least one memory, from a server, a message comprising information provided by a user device indicative of an online purchase transaction of a product;
   determining, from the message, a shipping address for the product;
   generating an address string by concatenating one or more lines of the shipping address from the message;
   parsing the address string into a set of tokens from the address string, wherein each token of the set of tokens is indicative of a portion of the address string;
   selecting a first word dictionary from two or more word dictionaries;
   converting the set of tokens to a plurality of numeric vectors using the first word dictionary, wherein text of a token of the set of tokens is replaced with a respective set of integers in the word dictionary;
   generating, by a recurrent neural network, an address deliverability score using the plurality of numeric vectors, wherein the plurality of numeric vectors are used as input for the recurrent neural network;
   identifying a set of corrective actions based on the address deliverability score;
   presenting the address deliverability score and the set of corrective actions;
   receiving an indication of a selection of a corrective action from the set of corrective actions; and
   generating a label to affix to a package for the product, wherein the label indicates the corrective action to implement prior to delivery of the package.

2. The method of claim 1, wherein the set of corrective actions comprises preventing completion of the online purchase transaction and blocking a cash on delivery payment option.

3. The method of claim 1, wherein selecting the first word dictionary from the two or more word dictionaries comprises:
   identifying the two or more word dictionaries by comparing text of the shipping address to words in the two or more word dictionaries;
   ranking the two or more word dictionaries based on a number of words of the shipping address in each of the two or more word dictionaries; and
   selecting the first word dictionary from the two or more word dictionaries based on the ranking,
   wherein converting the set of tokens to the plurality of numeric vectors comprises determining a respective integer for each token of the set of tokens based on the first word dictionary.

4. The method of claim 1, wherein generating the address string comprises:
   converting text of the address string to lowercase characters.

5. A method comprising:
   determining, by one or more computer processors coupled to at least one memory, a shipping address for a package comprising a product;
   generating an address string based on the shipping address;
   generating a set of tokens using the address string;
   selecting a first word dictionary from two or more word dictionaries;
   converting the set of tokens to a plurality of numeric vectors using the first word dictionary;
   generating, using a recurrent neural network, an address deliverability score using the plurality of numeric vectors;
   determining a set of corrective actions based on the address deliverability score;
   presenting the address deliverability score and the set of corrective actions; and
   receiving a selection of a corrective action from the set of corrective actions to implement prior to delivery of the package.

6. The method of claim 5, wherein determining the shipping address for the package comprising the product comprises:
   determining the shipping address from a message comprising information provided by a user device indicative of an online purchase of the product; or
   retrieving the shipping address from a remote location.

7. The method of claim 5, wherein generating the set of tokens comprises:
   identifying the first word dictionary based on one or more words of the address string; and
   parsing the address string into the set of tokens using the first word dictionary, wherein each token of the set of tokens is indicative of a portion of the shipping address.

8. The method of claim 5, wherein converting the set of tokens to the plurality of numeric vectors comprises:
   determining a respective integer for each token of the set of tokens based on the first word dictionary, wherein a text of a token of the set of tokens is replaced with the respective integer indicated in the first word dictionary; and
   generating the plurality of numeric vectors based on the set of tokens, wherein each vector of the plurality of numeric vectors corresponds to a respective token of the set of tokens.

9. The method of claim 5, wherein the shipping address comprises a first line of text and a second line of text and generating the address string based on the shipping address comprises:
   generating the address string by concatenating the first line of text and the second line of text and converting the text of the first line and the text of the second line to lowercase characters.

10. The method of claim 5, further comprising:
    receiving, an indication to generate a label to affix to the package; and
    generating the label to affix to the package.

11. The method of claim 10, wherein the label indicates the corrective action to implement prior to delivery of the package.

12. The method of claim 5, wherein the set of corrective actions comprises at least one of assigning delivery of the package to a specific delivery person based on the address deliverability score, requesting additional information for the shipping address from a user, generating a suggested replacement shipping address and presenting the suggested replacement shipping address to the user for confirmation, or flagging the package for a follow-up action.

13. The method of claim 5, wherein selecting the first word dictionary from the two or more word dictionaries comprises:
    identifying the two or more word dictionaries by comparing text of the shipping address to words in the two or more word dictionaries;
    ranking the two or more word dictionaries based on a number of words of the shipping address in each of the two or more word dictionaries; and
    selecting the first word dictionary from the two or more word dictionaries based on the ranking,
    wherein converting the set of tokens to the plurality of numeric vectors comprises determining a respective integer for each token of the set of tokens based on the first word dictionary.

14. A device comprising:
    at least one memory that stores computer-executable instructions; and
    at least one processor configured to access the at least one memory and execute the computer-executable instructions to:
       determine a shipping address for a package comprising a product;
       generate an address string based on the shipping address;
       generate a set of tokens by parsing the address string;
       select a first word dictionary from two or more word dictionaries;
       convert the set of tokens to a plurality of numeric vectors using the first word dictionary;
       generate, using a recurrent neural network, an address deliverability score using the plurality of numeric vectors;
       determine a set of corrective actions based on the address deliverability score;
       present the address deliverability score and the set of corrective actions; and
       receive a selection of a corrective action from the set of corrective actions to implement prior to delivery of the package.

15. The device of claim 14, wherein, to determine the shipping address for the package comprising the product, the at least one processor is further configured to access the at least one memory and execute the computer-executable instructions to:
    determine the shipping address from a message comprising information provided by a user device indicative of an online purchase of the product; or
    retrieve the shipping address from a remote location.

16. The device of claim 14, wherein, to generate the set of tokens, the at least one processor is further configured to access the at least one memory and execute the computer-executable instructions to:
    identify the first word dictionary based on one or more words of the address string; and
    parse the address string into the set of tokens using the first word dictionary, wherein each token of the set of tokens is indicative of a portion of the shipping address.

17. The device of claim 14, wherein, to convert the set of tokens to the plurality of numeric vectors, the at least one processor is further configured to access the at least one memory and execute the computer-executable instructions to:
    determine a respective integer for each token of the set of tokens based on the first word dictionary, wherein a text of a token of the set of tokens is replaced with the respective integer indicated in the first word dictionary; and
    generate the plurality of numeric vectors based on the set of tokens, wherein each vector of the plurality of numeric vectors corresponds to a respective token of the set of tokens.

18. The device of claim 14, wherein the shipping address comprises a first line of text and a second line of text and wherein, to generate the address string based on the shipping address, the at least one processor is further configured to access the at least one memory and execute the computer-executable instructions to:
    generate the address string by concatenating the first line of text and the second line of text and converting the text of the first line and the text of the second line to lowercase characters.

19. The device of claim 14, wherein the at least one processor is further configured to access the at least one memory and execute the computer-executable instructions to:
    receive an indication to generate a label to affix to the package; and
    generate the label to affix to the package.

20. The device of claim 14, wherein, to select the first word dictionary from the two or more word dictionaries, the at least one processor is further configured to access the at least one memory and execute the computer-executable instructions to:
- identify the two or more word dictionaries by comparing text of the shipping address to words in the two or more word dictionaries;
- rank the two or more word dictionaries based on a number of words of the shipping address in each of the two or more word dictionaries; and
- select the first word dictionary from the two or more word dictionaries based on the ranking,
- wherein, to convert the set of tokens to the plurality of numeric vectors, the at least one processor is further configured to access the at least one memory and execute the computer-executable instructions to determine a respective integer for each token of the set of tokens based on the first word dictionary.

\* \* \* \* \*